(12) United States Patent
Endo et al.

(10) Patent No.: US 6,922,267 B2
(45) Date of Patent: Jul. 26, 2005

(54) IMAGE DISPLAY APPARATUS

(75) Inventors: Takeshi Endo, Osaka (JP); Yasushi Kobayashi, Itami (JP); Yasushi Tanijiri, Osakasayama (JP); Tetsuya Noda, Tenri (JP); Hiroaki Ueda, Suita (JP)

(73) Assignee: Minolta Co., Ltd., Osaka (JP)

( * ) Notice: Subject to any disclaimer, the term of this patent is extended or adjusted under 35 U.S.C. 154(b) by 280 days.

(21) Appl. No.: 10/100,323

(22) Filed: Mar. 18, 2002

(65) Prior Publication Data

US 2002/0135830 A1 Sep. 26, 2002

(30) Foreign Application Priority Data

Mar. 21, 2001 (JP) .................................... 2001-080624

(51) Int. Cl.[7] ............................................... G02B 5/32
(52) U.S. Cl. ........................... 359/15; 359/13; 359/19; 359/630; 359/634
(58) Field of Search ............................. 359/15, 13, 1, 359/19, 622, 620, 630, 631, 634; 345/7–9

(56) References Cited

U.S. PATENT DOCUMENTS 5,475,512 A    12/1995  Nakazawa et al. ............. 359/13
6,396,463 B1 *  5/2002  Tomono ........................ 345/8

FOREIGN PATENT DOCUMENTS

| JP | 04-118620 A | 4/1992 |
| JP | 07-212680 A | 8/1995 |
| JP | 2000-122589 A | 4/2000 |
| JP | 2000-267042 A | 9/2000 |
| JP | 2001-004956 A | 1/2001 |

* cited by examiner

Primary Examiner—Fayez G. Assaf
(74) Attorney, Agent, or Firm—Sidley Austin Brown & Wood LLP

(57) ABSTRACT

An image display apparatus has an image display device for displaying an image, an eyepiece optical system, including a holographic magnifying optical element, for magnifying and projecting the image, and a holographic filter, disposed either as part of the image display device or in the optical path between the image display device and the eyepiece optical system, for restricting the wavelength range of the image light.

17 Claims, 19 Drawing Sheets

FIG. 31A
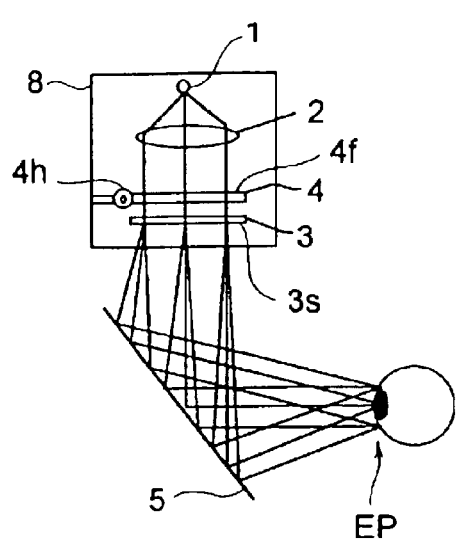
FIG. 31B
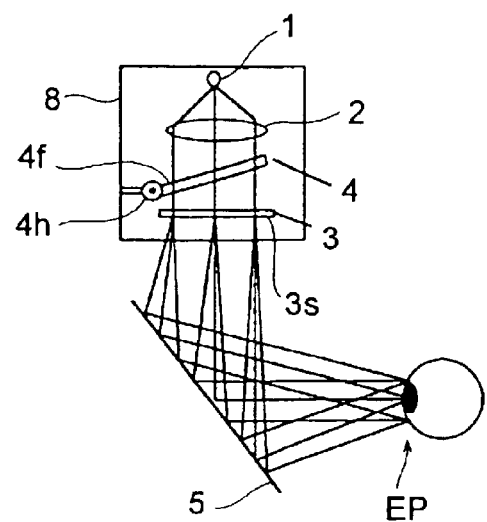
FIG. 32A
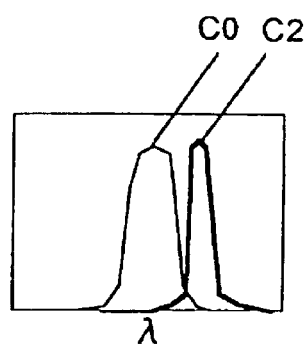
FIG. 32B
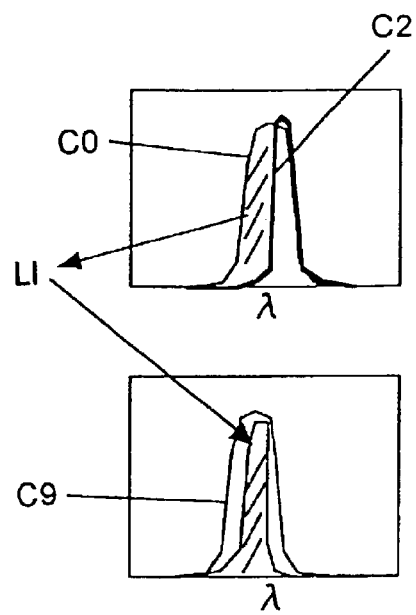
FIG. 32C

IMAGE DISPLAY APPARATUS

This application is based on Japanese Patent Application No. 2001-80624 filed on Mar. 21, 2001, the contents of which are hereby incorporated by reference.

BACKGROUND OF THE INVENTION

1. Field of the Invention

The present invention relates to an image display apparatus. More particularly, the present invention relates to, for example, an image display apparatus such as a HMD (head-mounted display) or HUD (head-up display) that operates by projecting a two-dimensional image formed on a liquid crystal display (LCD) onto an observer's eye on a see-through basis by using a holographic optical element (HOE).

2. Description of the Prior Art

Conventionally, various see-through-type image display apparatus have been proposed that present a projected image in a form superimposed on an image of the outside world by the use of a holographic optical element (U.S. Pat. No. 5,475,512, and Japanese Patent Applications Laid-Open Nos. 2001-4956, 2000-122589, H4-118620, and others).

However, a holographic optical element used as a combiner in an eyepiece optical system has a narrow range of angle selectivity, and therefore, in a conventional see-through-type image display apparatus, the observation pupil is small, which makes the displayed image difficult to observe. Giving the holographic optical element a wider range of angle selectivity results in giving it a wider range of wavelength selectivity, permitting light of wavelengths unnecessary for image display to be diffracted so as to reach the observer's pupil. Thus, the displayed image suffers from bleeding of colors comparable with chromatic aberration.

SUMMARY OF THE INVENTION

An object of the present invention is to provide an image display apparatus that presents high-quality images with reduced chromatic aberration appearing in its eyepiece optical system including a holographic optical element.

To achieve the above object, according to one aspect of the present invention, an image display apparatus is provided with: an image display device for displaying an image; an eyepiece optical system, including a holographic magnifying optical element, for magnifying and projecting the image; and a holographic filter, disposed either as part of the image display device or in the optical path between the image display device and the eyepiece optical system, for restricting the wavelength range of the image light.

According to another aspect of the present invention, an image display apparatus is provided with: an image display device for displaying an image; an eyepiece optical system, including a holographic magnifying optical element, for magnifying and projecting the image; and at least one holographic filter, arranged as part of the image display device, for restricting the wavelength range of the light incident on the holographic magnifying optical element.

According to still another aspect of the present invention, an image display apparatus is provided with: an image display device for displaying an image; an eyepiece optical system, including a holographic magnifying optical element, for magnifying and projecting the image; and at least one holographic filter, arranged between the image display device and the eyepiece optical system, for restricting the wavelength range of the light incident on the holographic magnifying optical element.

According to a further aspect of the present invention, an image display apparatus is provided with: an image display device for displaying an image; an eyepiece optical system, including a holographic magnifying optical element, for magnifying and projecting the image onto an observer's eye; and a holographic filter, disposed either as part of the eyepiece optical system or in the optical path between the eyepiece optical system and the observer's eye, for restricting the wavelength range of the image light. Here, the image light that has been transmitted through the holographic filter without being diffracted thereby is observed by the observer's eye.

BRIEF DESCRIPTION OF THE DRAWINGS

This and other objects and features of the present invention will become clear from the following description, taken in conjunction with the preferred embodiments with reference to the accompanying drawings in which:

FIGS. 31A and 31B are optical arrangement diagrams schematically showing the optical arrangement of a nineteenth embodiment of the invention;

FIGS. 32A to 32C are graphs showing the variation of the diffraction wavelength distribution according to the inclination of the holographic filter in the nineteenth embodiment;

DESCRIPTION OF THE PREFERRED EMBODIMENTS

Figure 1:
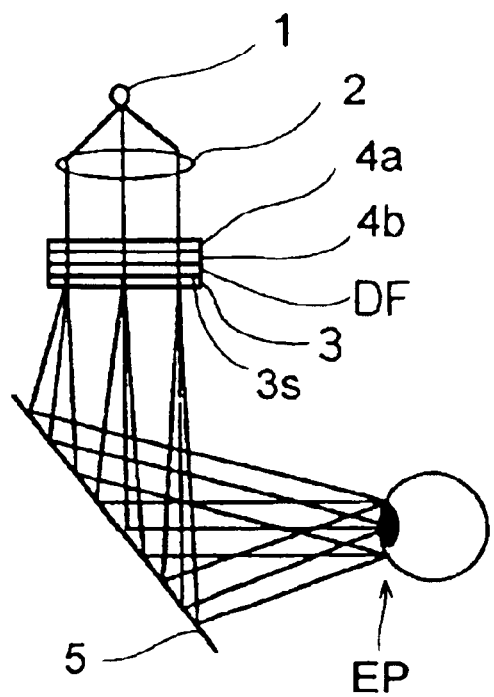
FIG. 1 is an optical arrangement diagram schematically showing the optical arrangement of a first embodiment of the invention.

Hereinafter, image display apparatus embodying the present invention will be described with reference to the drawings. In the following descriptions, such components as are identical or comparable among different embodiments are identified with the same reference numerals and symbols, and overlapping explanations will be omitted unless necessary.

First Embodiment (FIGS. 1 to 4C)

FIG. 1 shows the optical arrangement of a first embodiment of the invention. In FIG. 1, reference numeral 1 represents an LED (light-emitting diode), reference numeral 2 represents a condenser lens for illumination, reference numeral 3 represents a transmissive LCD, reference numerals 4a and 4b represent a first and a second holographic filter each realized with a reflective hologram, reference numeral 5 represents a holographic magnifying optical element, reference symbol DF represents a diffuser plate, and reference symbol EP represents an observer's eye (pupil). The LED (1) is an illumination light source that emits illumination light for illuminating the display surface (3s) of the LCD (3). The condenser lens (2) is a collimator lens that forms the light from the LED (1) into a parallel beam. The LCD (3) is a transmissive spatial modulation element that displays a two-dimensional image on its display surface (3s). This LCD (3) is a display device of a non-illuminative type that does not emit light by itself, and therefore the two-dimensional image formed on it is made visible when its display surface (3s) is illuminated by the illumination light from the LED (1). The diffuser plate (DF) is arranged on the illuminated side of the LCD (3), and serves to make the observation pupil (EP) have a predetermined size. The diffuser plate (DF) may be arranged elsewhere, but it is preferable that the illumination light be diffused after being subjected to wavelength restriction by the filters (4a, 4b).

As described above, the LED (1), the condenser lens (2), and the LCD (3) together serve as an image display means by displaying a two-dimensional image, and the holographic magnifying optical element (5) serves as an eyepiece optical system by enlarging and projecting the two-dimensional image onto the observer's eye (EP). Here, the display of an image may be achieved by the use of a reflective spatial modulation element (such as a reflective LCD) instead, and this applies also to the other embodiments described hereinafter.

For easy observation, it is preferable that the pupil (EP) be given a diameter of 2 mm or larger. However, giving the holographic magnifying optical element (5) a wider range of angle selectivity to obtain a larger pupil diameter results in giving it a wider range of wavelength selectivity, causing light having wavelengths unnecessary for image display to be diffracted so as to reach the pupil (EP). As a result, the displayed image suffers from bleeding of colors comparable with chromatic aberration. This can be avoided by narrowing the wavelength range of the image light. Accordingly, in this embodiment, the first and second holographic filters (4a and 4b) that restrict the wavelength range of the light incident on the holographic magnifying optical element (5) by cutting reflected light are arranged as part of the image display means in the optical path between the condenser lens (2) and the LCD (3). In this arrangement, the first and second holographic filters (4a, 4b) are not involved in imaging. This permits greater tolerances for errors in design and manufacture, and thus helps realize an inexpensive arrangement.

Figure 3A:
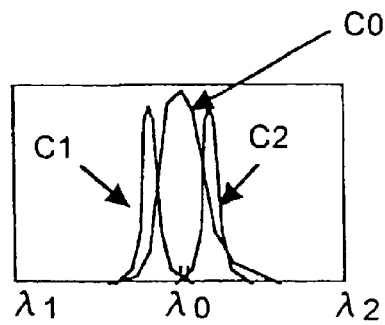
FIGS. 3A and 3B are graphs showing the wavelength distribution of the light before and after passing the holographic filter in the first embodiment.
Figure 3B:
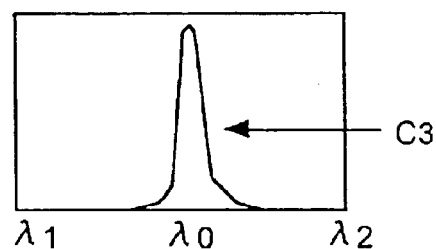

FIGS. 3A and 3B are graphs showing the wavelength distribution of the light before and after passing the first and second holographic filters (4a, 4b) (with the wavelength taken along the horizontal axis, $\lambda 1 < \lambda 0 < \lambda 2$). In FIG. 3A, line (C0) represents the light emission wavelength distribution of the LED (1), and lines (C1) and (C2) respectively represent the diffraction wavelength distribution of the first and second holographic filters (4a, 4b). The first and second holographic filters (4a, 4b), which are reflective holograms, cut reflected light, and therefore transmitted light is used as the image light. Thus, the light from the LED (1), after passing the first and second holographic filters (4a, 4b), comes to have a sharp wavelength distribution that is cut on both sides of line (C0) as represented by line (C3) in FIG. 3B.

That is, the first holographic filter (4a) has a diffraction center wavelength shorter than the diffraction center wavelength of the holographic magnifying optical element (5), and therefore the first holographic filter (4a) restricts the wavelength range of the image light by cutting a shorter-wavelength-side portion of the light emission wavelength distribution (C0) of the LED (1). On the other hand, the second holographic filter (4b) has a diffraction center wavelength longer than the diffraction center wavelength of the holographic magnifying optical element (5), and therefore the second holographic filter (4b) restricts the wavelength range of the image light by cutting a longer-wavelength-side portion of the light emission wavelength distribution (C0) of the LED (1). This reduces the chromatic aberration caused by the holographic magnifying optical element (5).

Figure 4A:
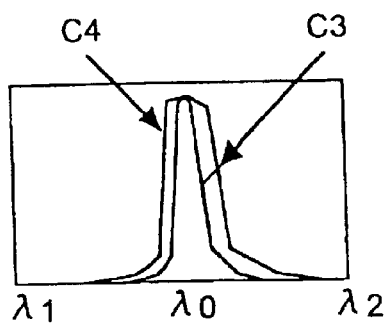
FIGS. 4A to 4C are graphs showing the relationship between the diffraction efficiency distribution of the holographic magnifying optical element and the wavelength distribution of the light after passing the holographic filter in the first embodiment.
Figure 4B:
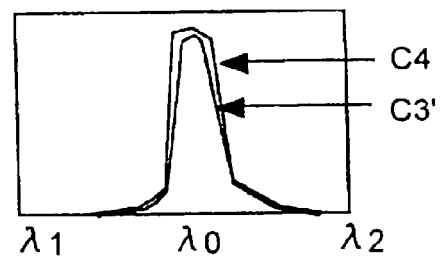
Figure 4C:
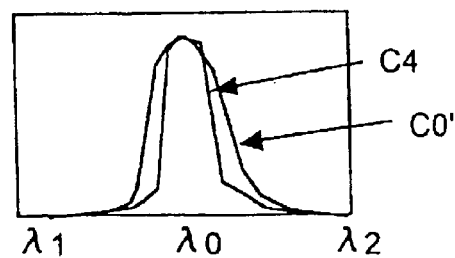

FIGS. 4A to 4C are graphs showing the relationship between the diffraction efficiency distribution of the holographic magnifying optical element (5) and the wavelength distribution of the light after passing the first and second holographic filters (4a, 4b). In FIG. 4A, line (C4) represents the diffraction efficiency distribution of the holographic magnifying optical element (5). By using a holographic magnifying optical element (5) of which the diffraction efficiency distribution exhibits a large half-width like this, it is possible to give it a wide range of angle selectivity and thereby obtain a large observation pupil (EP). In addition, as line (C3) indicates, the wavelength range of the light after passing the first and second holographic filters (4a, 4b) is narrow, and therefore only light having the desired wavelength range reaches the pupil (EP). This makes it possible to display high-quality images with reduced chromatic aberration.

In FIG. 4C, line (C0') represents the wavelength distribution of the image light as observed when the first and second holographic filters (4a, 4b) are absent. In FIG. 4B, line (C3') represents the wavelength distribution of the light after passing the first and second holographic filters (4a, 4b) as observed when the diffraction wavelength of the first holographic filter (4a) is made shorter and the diffraction wavelength of the second holographic filter (4b) is made longer. Without the first and second holographic filters (4a, 4b), the image light has a wider wavelength range relative to the design wavelength of the holographic magnifying optical element (5). This increases chromatic aberration and thus degrades image quality. By contrast, by narrowing the wavelength range of the image light as indicated by line (C3'), it is possible to obtain good image quality. In addition, more light passes the first and second holographic filters (4a, 4b) as the image light, and thus it is possible to observe brighter images than in the case shown in FIG. 4A.

As described above, when reflected light is cut by the first and second holographic filters (4a, 4b), the wavelength distribution of the light incident on the holographic magnifying optical element (5) becomes sharper. This makes the obtained image darker but better in quality. By contrast, when the wavelength range of the light that is transmitted through the first and second holographic filters (4a, 4b) is made wider, the resulting chromatic aberration makes the obtained image poorer in quality but brighter. Therefore, it is preferable to strike a proper balance between chromatic aberration and brightness by making the half-width of the diffraction efficiency distribution of the holographic magnifying optical element (5) sufficiently large to obtain a satisfactorily large observation pupil (EP) while restricting the wavelength range of the light incident on the holographic magnifying optical element (5) with the first and second holographic filters (4a, 4b).

The holographic optical elements described above, i.e. the first and second holographic filters (4a, 4b) and the holographic magnifying optical element (5), are each realized with a reflective, phase-type, volume hologram. This applies also to the holographic optical elements used in the other embodiments described hereinafter. In these holographic optical elements, a photosensitive material is used, such as a photopolymer, silver halide based material, or bichromated gelatin. Of these materials, a photopolymer is particularly preferable because it permits manufacture by a dry process. All these holographic optical elements can be manufactured by a manufacturing process similar to those by which common reflective holograms are manufactured.

Figure 2:
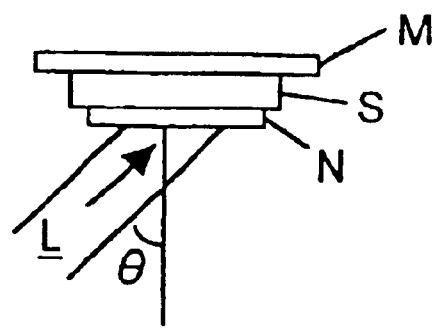
FIG. 2 is a sectional view showing the manufacturing process of the holographic filter in the first embodiment.

FIG. 2 is a sectional view of the first and second holographic filters (4a, 4b), illustrating their manufacturing process (single-beam holography). In FIG. 2, reference symbol L represents a laser beam, reference symbol M represents a mirror, reference symbol S represents a substrate, and reference numeral N represents a photosensitive material. The pitch of the interference fringes that are recorded on the photosensitive material (N) is determined by the wavelength of the laser beam (L), and therefore, to produce a plurality of holographic filters having slightly different center wavelengths like the first and second holographic filters (4a, 4b), it is necessary to use a plurality of laser beams (L) having slightly different wavelengths. However, the pitch of the interference fringes recorded on the photosensitive material (N) varies also according to the angle of incidence ($\theta$) at which the laser beam (L) is incident for exposure. Thus, by varying the angle of incidence ($\theta$) of the laser beam (L) and thereby varying the pitch of the interference fringes recorded on the photosensitive material (N), it is possible to produce a plurality of holographic filters having different diffraction wavelengths. As the angle of incidence ($\theta$) increases, the pitch of the interference fringes increases. Accordingly, to produce a holographic filter having a center wavelength longer than $\lambda 0$, the angle of incidence ($\theta$) is made larger. In this way, by the use of a single laser beam source, it is possible not only to manufacture holographic filters (4a, 4b) having slightly different center wavelengths, but also to manufacture holographic filters ready for colors.

In the first embodiment, two holographic filters (4a and 4b) are cemented together. However, it is also possible to use a holographic filter having a single layer of a photosensitive material (N) on which two or more types of interference fringes are recorded by multiple exposure (for example as in the sixth embodiment described later). By exposing a single layer of a photosensitive material (N) to laser beams incident at different angles of incidence ($\theta$) simultaneously or sequentially, it is possible to obtain a color holographic optical element that exhibits high diffraction efficiency to light of a plurality of wavelengths. In this way, a plurality of holographic filters having different center wavelengths can be manufactured by cementing together or by multiple exposure. Whereas producing a holographic filter by cementing together a plurality of reflective holograms has the advantage of high diffraction efficiency, producing one by multiple exposure has the advantage of making it easy to manufacture.

Figure 5:
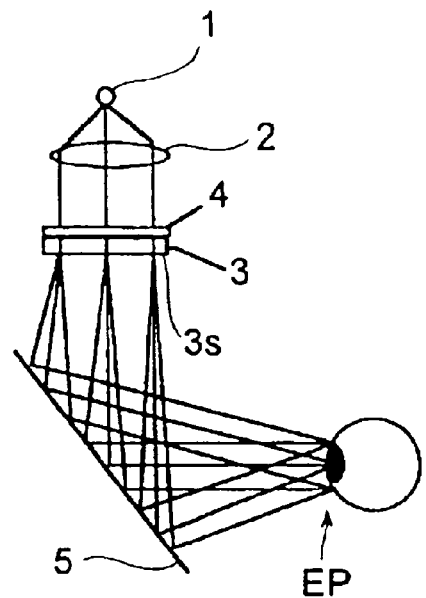
FIG. 5 is an optical arrangement diagram schematically showing the optical arrangement of a second embodiment of the invention.
Figures 6A, 6B:
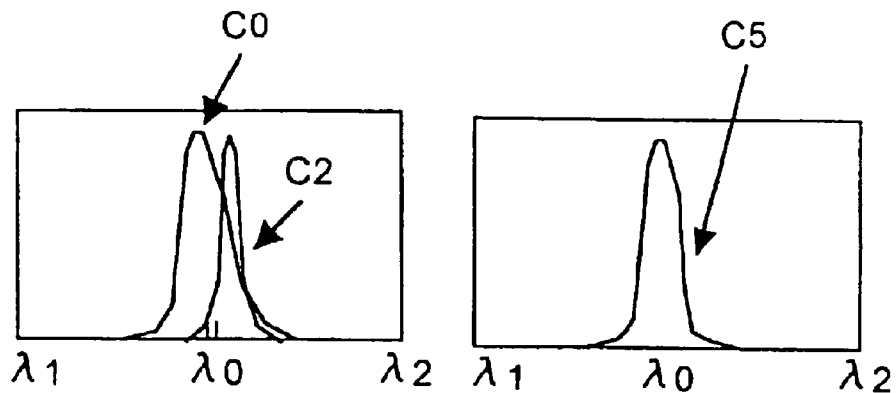
FIGS. 6A and 6B are graphs showing the wavelength distribution of the light before and after passing the holographic filter in the second embodiment.

Second Embodiment (FIGS. 5 to 6B)

FIG. 5 shows the optical arrangement of a second embodiment of the invention. In this image display apparatus, a single holographic filter (4) realized with a reflective hologram is arranged as part of an image display means in the optical path between a condenser lens (2) and an LCD (3). The holographic filter (4) has a diffraction center wavelength longer than the diffraction center wavelength of the holographic magnifying optical element (5), and thus restricts the wavelength range of the light incident on the holographic magnifying optical element (5) by cutting reflected light in a longer-wavelengthside portion of this light.

FIGS. 6A and 6B are graphs showing the wavelength distribution of the light before and after passing the holographic filter (4). In FIG. 6A, line (C0) represents the light emission wavelength distribution of the LED (1), and line (C2) represents the diffraction wavelength distribution of the holographic filter (4). The holographic filter (4), which is a reflective hologram, cuts reflected light, and therefore transmitted light is used as the image light. Thus, the light from the LED (1), after passing the holographic filter (4), comes to have a sharp wavelength distribution that is cut on one side of line (C0) as represented by line (C5) in FIG. 6B. That is, the holographic filter (4) has a diffraction center wavelength longer than the diffraction center wavelength of the holographic magnifying optical element (5), and therefore the holographic filter (4) restricts the wavelength range of the image light by cutting a longer-wavelength-side portion of the light emission wavelength distribution (C0) of the LED (1). This reduces the chromatic aberration caused by the holographic magnifying optical element (5). It is preferable, as in this embodiment, to cut the light emission wavelength distribution in that side thereof where it has a longer hemline, because this is more effective in reducing chromatic aberration. However, as required, it is also possible to cut another portion (for example, a shorter-wavelength-side portion) of the light emission wavelength distribution.

Figure 7:
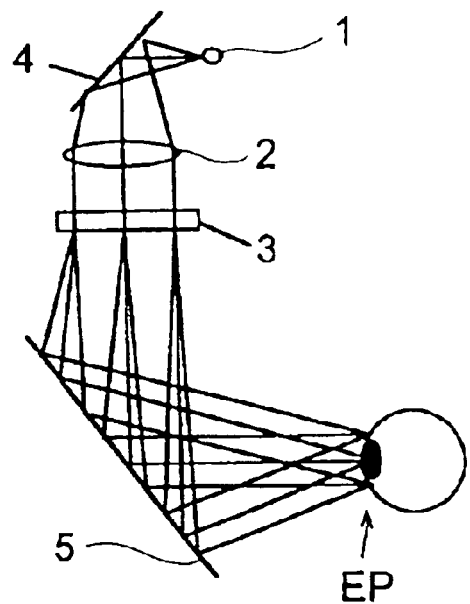
FIG. 7 is an optical arrangement diagram schematically showing the optical arrangement of a third embodiment of the invention.
Figures 8A, 8B:
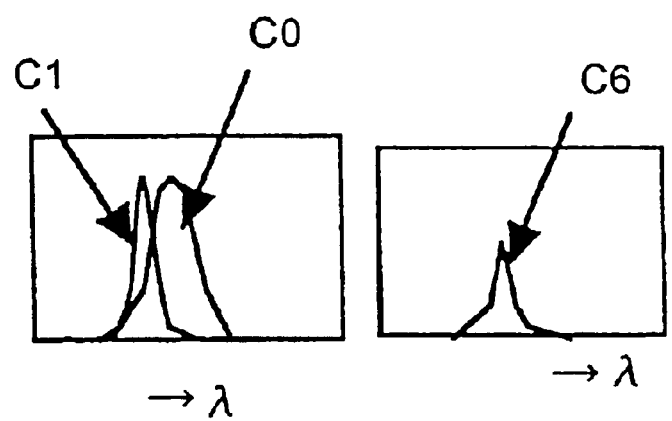
FIGS. 8A and 8B are graphs showing the wavelength distribution of the light before and after passing the holographic filter in the third embodiment.

Third Embodiment (FIGS. 7 to 8B)

FIG. 7 shows the optical arrangement of a third embodiment of the invention. In this image display apparatus, a single holographic filter (4) realized with a reflective hologram is arranged as part of an image display means in the optical path between an LED (1) and a condenser lens (2). The holographic filter (4) has a diffraction center wavelength shorter than the diffraction center wavelength of the holographic magnifying optical element (5), and thus restricts the wavelength range of the light incident on the holographic magnifying optical element (5) by cutting transmitted light in a shorter-wavelength-side portion of this light.

FIGS. 8A and 8B are graphs showing the wavelength distribution of the light before and after passing the holographic filter (4). In FIG. 8A, line (C0) represents the light emission wavelength distribution of the LED (1), and line (C1) represents the diffraction wavelength distribution of the holographic filter (4). The holographic filter (4), which is a reflective hologram, cuts transmitted light, and therefore reflected light is used as the image light. Thus, the light from the LED (1), after passing the holographic filter (4), comes to have a sharp wavelength distribution that is cut on one side of line (C0) as represented by line (C6) in FIG. 8B. That is, the holographic filter (4) has a diffraction center wavelength shorter than the diffraction center wavelength of the holographic magnifying optical element (5), and therefore the holographic filter (4) restricts the wavelength range of the image light by cutting a longer-wavelength-side portion of the light emission wavelength distribution (C0) of the LED (1). This reduces the chromatic aberration caused by the holographic magnifying optical element (5). It is preferable, as in this embodiment, to cut the light emission wavelength distribution in that side thereof where it has a longer hemline, because this is more effective in reducing chromatic aberration. However, as required, it is also possible to cut another portion (for example, a shorter-wavelength-side portion) of the light emission wavelength distribution.

Figure 9:
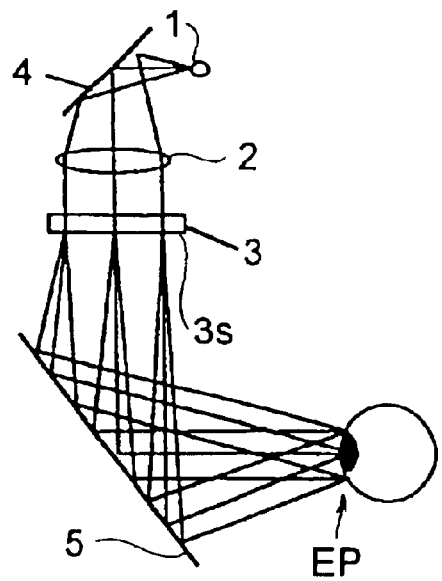
FIG. 9 is an optical arrangement diagram schematically showing the optical arrangement of a fourth embodiment of the invention.
Figure 10A:
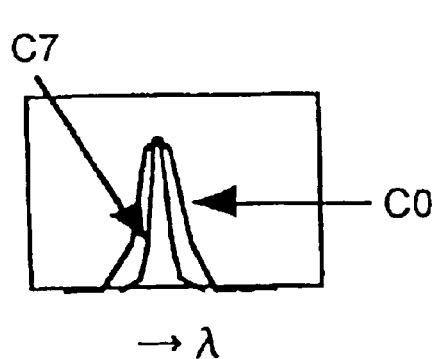
FIGS. 10A and 10B are graphs showing the wavelength distribution of the light before and after passing the holographic filter in the fourth embodiment.
Figure 10B:
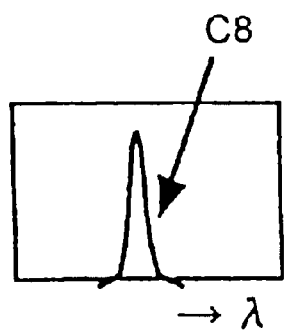

Fourth Embodiment (FIGS. 9 to 10B)

FIG. 9 shows the optical arrangement of a fourth embodiment of the invention. In this image display apparatus, in the same optical arrangement as that of the third embodiment, the holographic filter (4) is given a diffraction wavelength range narrower than the diffraction wavelength range of the holographic magnifying optical element (5). The holographic filter (4) restricts the wavelength range of the light incident on the holographic magnifying optical element (5) by cutting transmitted light in both sides of the light emission wavelength distribution.

FIGS. 10A and 10B are graphs showing the wavelength distribution of the light before and after passing the holographic filter (4). In FIG. 10A, line (C0) represents the light emission wavelength distribution of the LED (1), and line (C7) represents the diffraction wavelength distribution of the holographic filter (4). The holographic filter (4), which is a reflective hologram, cuts transmitted light, and therefore reflected light is used as the image light. Thus, the light from the LED (1), after passing the holographic filter (4), comes to have a sharp wavelength distribution that is cut on both sides of line (C0) as represented by line (C8) in FIG. 10B. That is, the diffraction wavelength range of the holographic filter (4) is narrower than the half-width of the wavelength range of the LED (1), and therefore the holographic filter (4) restricts the wavelength range of the image light by cutting the light emission wavelength distribution (C0) of the LED (1) in both sides thereof This reduces the chromatic aberration caused by the holographic magnifying optical element (5). For this purpose, it is preferable to design the holographic filter (4) to have a diffraction wavelength range narrower than the diffraction wavelength range of the holographic magnifying optical element (5). This is achieved, for example, by controlling the refractive index modulation factor and film thickness of these elements.

Figure 11:
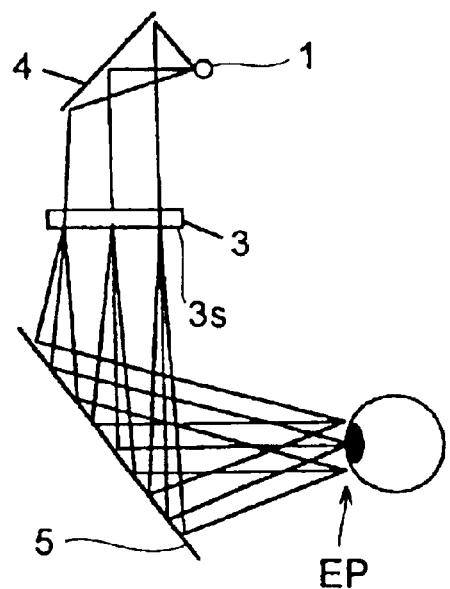
FIG. 11 is an optical arrangement diagram schematically showing the optical arrangement of a fifth embodiment of the invention.
Figure 12A:
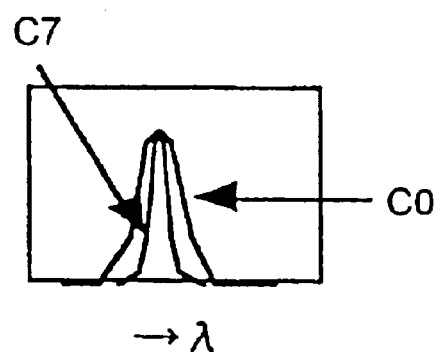
FIGS. 12A and 12B are graphs showing the wavelength distribution of the light before and after passing the holographic filter in the fifth embodiment.
Figure 12B:
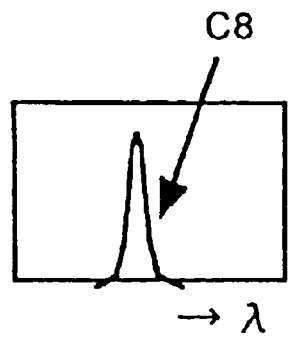

Fifth Embodiment (FIGS. 11 to 12B)

FIG. 11 shows the optical arrangement of a fifth embodiment of the invention. In this image display apparatus, in the same optical arrangement as that of the fourth embodiment, the holographic filter (4) is given a positive optical power so as to function also as a condenser lens for illumination. By making the holographic filter (4) function also as a condenser lens (2), it is possible to reduce the total weight, size, and cost so much as to correspond to the component thereby omitted, and simplify accordingly the arrangement of the image display means as a whole including the illumination system. FIG. 12 is a graph showing the wavelength distribution of the light before and after passing the holographic filter (4). The holographic filter (4), which restricts the wavelength range of the light incident on the holographic magnifying optical element (5), functions in the same manner as in the fourth embodiment, and therefore its explanation will be omitted.

Figure 13:
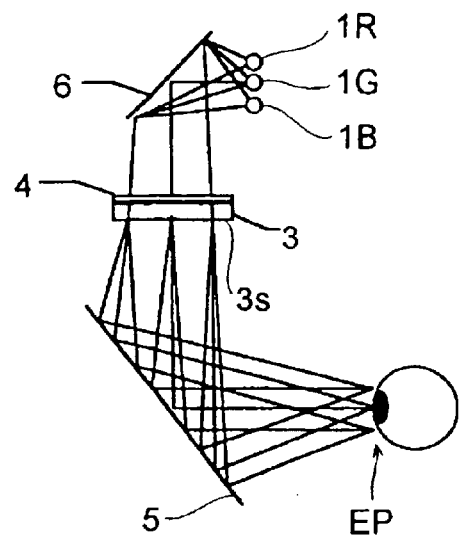
FIG. 13 is an optical arrangement diagram schematically showing the optical arrangement of a sixth embodiment of the invention.

Sixth Embodiment (FIGS. 13 and 14)

FIG. 13 shows the optical arrangement of a sixth embodiment of the invention. In this image display apparatus, the holographic magnifying optical element (5) has three diffraction center wavelengths respectively corresponding to three primary color components, i.e. R (red), G (green), and B (blue). The illumination light source is composed of three LEDs (1R, 1G, and 1B) and has three light mission center wavelengths, i.e. for R, G, and B, respectively corresponding to those diffraction center wavelengths. The holographic filter (4) has, for each of the R, G, and B wavelengths, two diffraction center wavelengths, i.e. a diffraction center wavelength shorter than the diffraction center wavelength of the holographic magnifying optical element (5) and a diffraction center wavelength longer than the diffraction center wavelength of the holographic magnifying optical element (5). Thus, the holographic magnifying optical element (5) restricts separately the three, i.e. R, G, and B, wavelength ranges. In this arrangement, even in color display, colors do not separate at the pupil (EP). This makes high-quality display of images possible. Moreover, this arrangement helps simplify the arrangement of an illumination system ready for colors, and thus helps reduce the total weight, size, and cost.

Figure 14A:
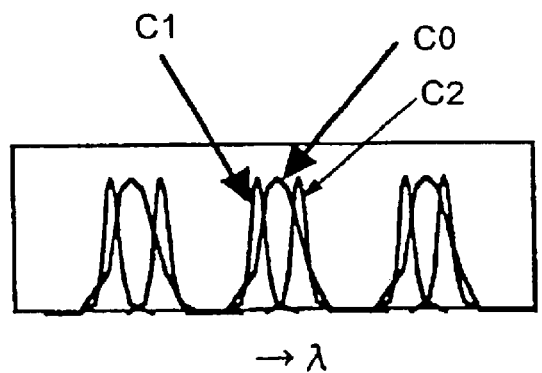
FIGS. 14A and 14B are graphs showing the wavelength distribution of the light before and after passing the holographic filter in the sixth embodiment.
Figure 14B:
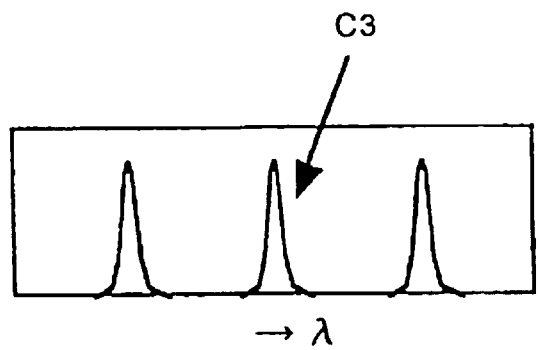

The LEDs (1R, 1G, and 1B), a reflective hologram (6), the holographic filter (4), and the holographic magnifying optical element (5) each function separately for the R, G, and B colors to achieve color display. That is, the reflective hologram (6) functions both as a condenser lens and as a color integrator, and the illumination light source composed of three LEDs (1R, 1G, and 1B) illuminates the display surface (3s) of the LCD (3) by emitting light on a time-division basis to achieve color display. Then, the holographic filter (4), for each of the R, G, and B wavelength ranges, restricts the wavelength range of the light incident on the holographic magnifying optical element (5) by cutting reflected light in both sides of the light emission wavelength distribution of that light. FIGS. 14A and 14B are graphs showing the wavelength distribution of the light before and after passing the holographic filter (4). When considered for each of the R, G, and B wavelength ranges, how the holographic filter (4) restricts the wavelength range of the light incident on the holographic magnifying optical element (5) is the same as in the first embodiment, and therefore its explanation will be omitted.

The holographic filter (4) is manufactured, as described earlier, by cementing holograms together or by multiple exposure. That is, it is manufactured by cementing together six holograms each produced by exposure corresponding to a single color, or by subjecting a single layer of a photosensitive material (N) to multiple exposure (i.e. multiple exposure at both the longer- and shorter-wavelength sides of each of the R, G, and B color). The former method helps increase the diffraction efficiency of the holographic filter (4) and thereby obtain a greater filtering effect. The latter method helps make the holographic filter (4) easy and inexpensive to manufacture. Alternatively, it is also possible to use six individual holographic filters to cut the light emission wavelength range in both sides thereof or, as a simplified form, to use three holographic filters to cut the light emission wavelength range in one side thereof. When the light emission wavelength range is cut in one side thereof, it is preferable to cut it in that side thereof where it has a longer hemline.

Figure 15:
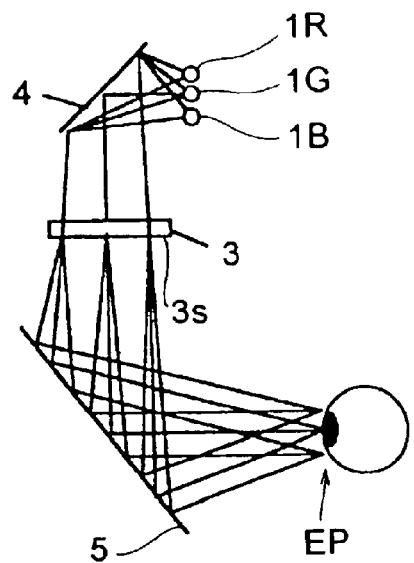
FIG. 15 is an optical arrangement diagram schematically showing the optical arrangement of a seventh embodiment of the invention.
Figure 16A:
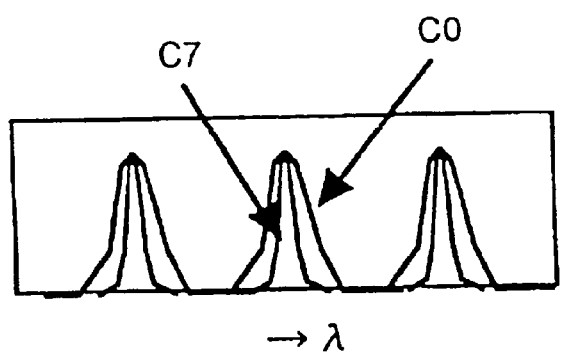
FIGS. 16A and 16B are graphs showing the wavelength distribution of the light before and after passing the holographic filter in the seventh embodiment.
Figure 16B:
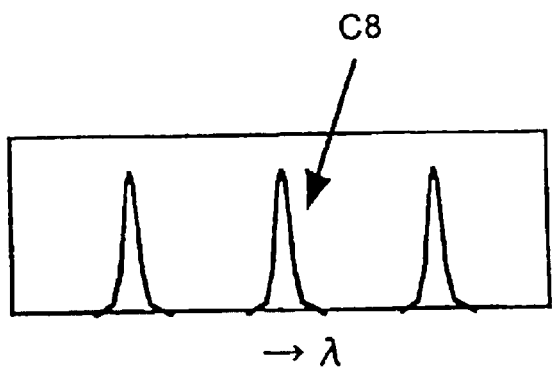
Figure 17:
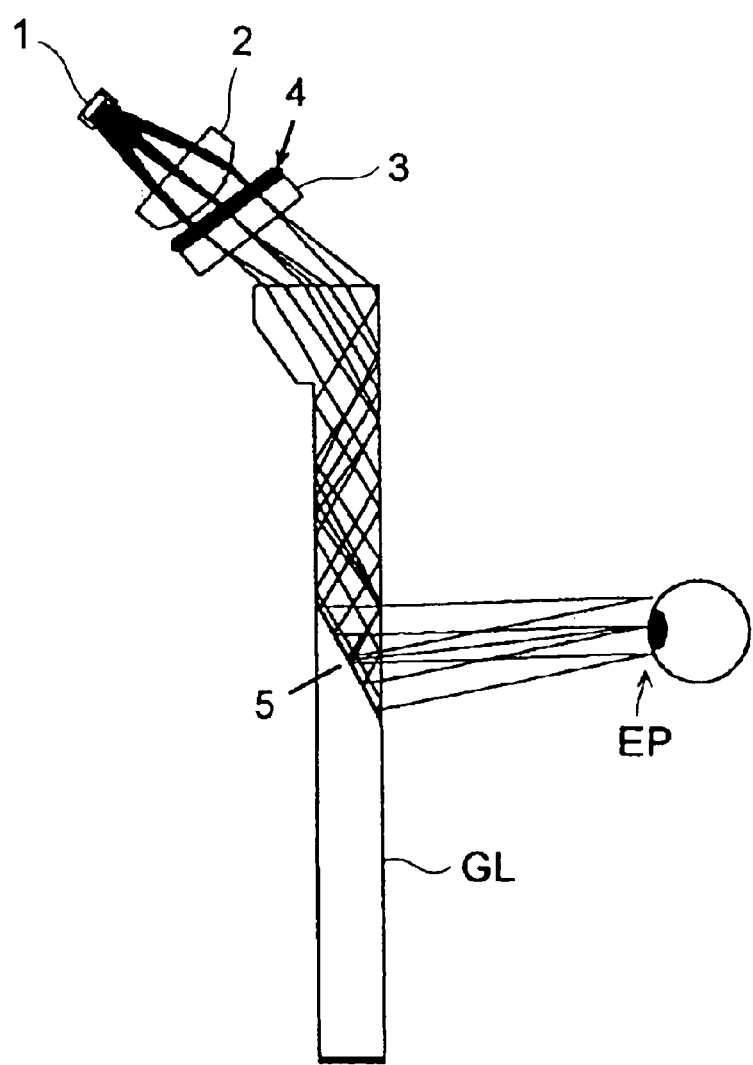
FIG. 17 is an optical arrangement diagram schematically showing the optical arrangement of an eighth embodiment of the invention.
Figure 18:
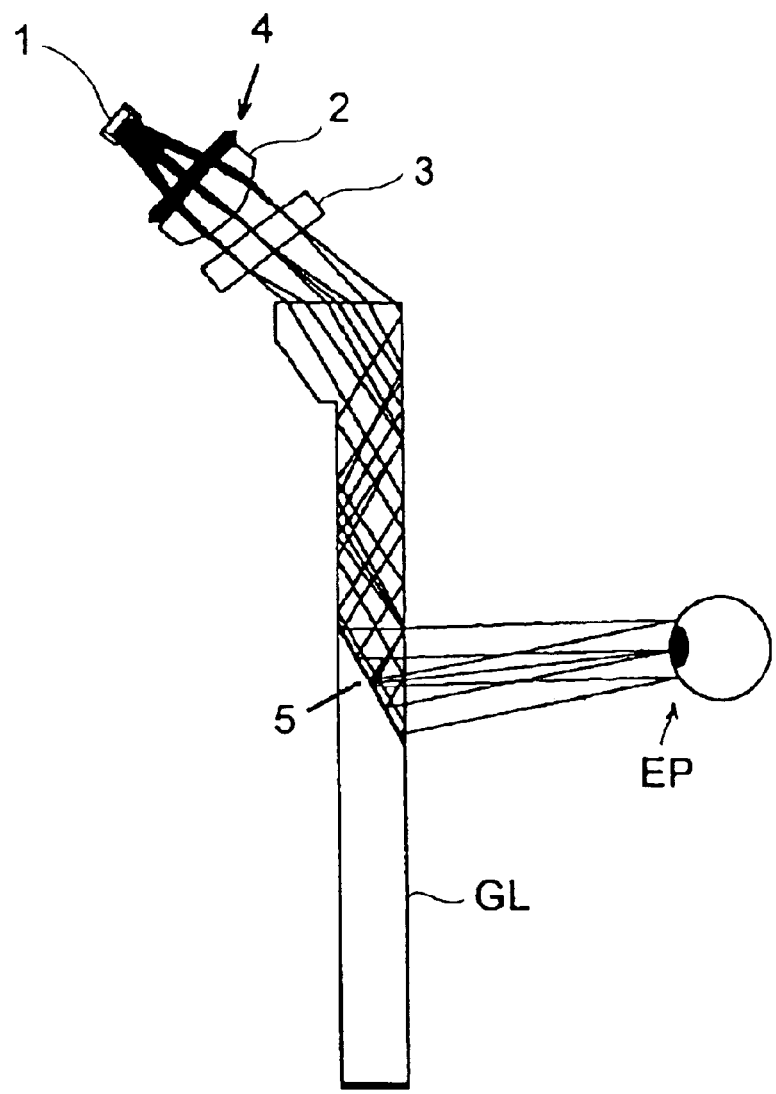
FIG. 18 is an optical arrangement diagram schematically showing the optical arrangement of a ninth embodiment of the invention.
Figure 19:
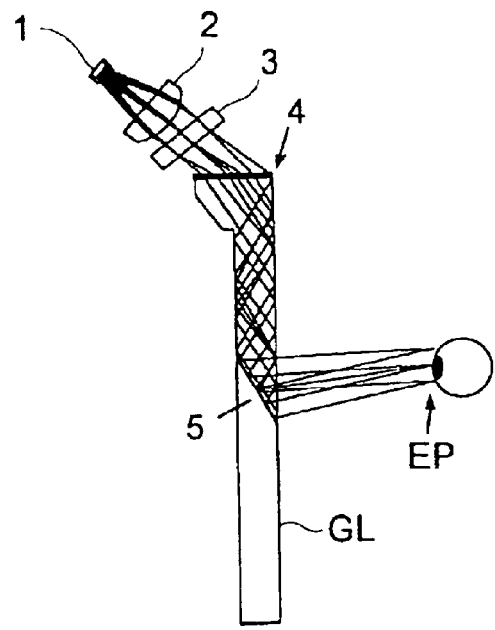
FIG. 19 is an optical arrangement diagram schematically showing the optical arrangement of a tenth embodiment of the invention.
Figure 20:
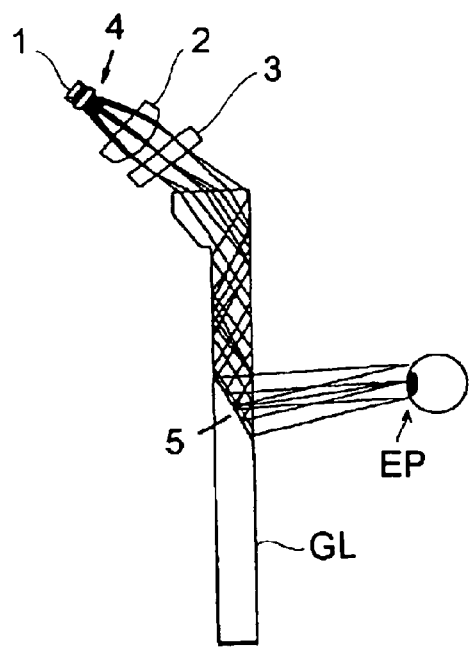
FIG. 20 is an optical arrangement diagram schematically showing the optical arrangement of an eleventh embodiment of the invention.
Figure 21:
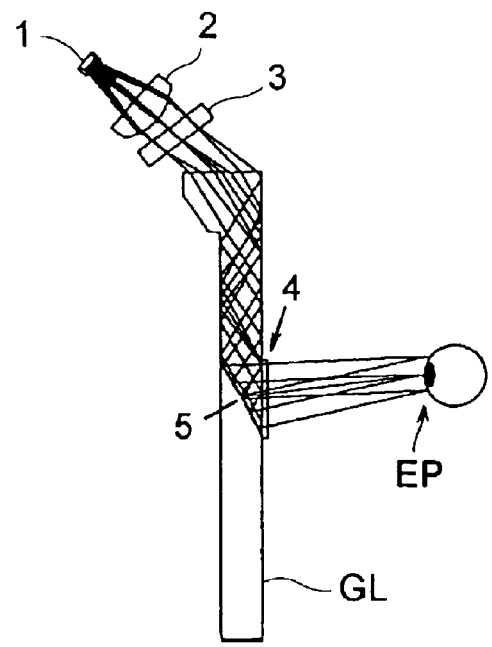
FIG. 21 is an optical arrangement diagram schematically showing the optical arrangement of a twelfth embodiment of the invention.
Figure 22:
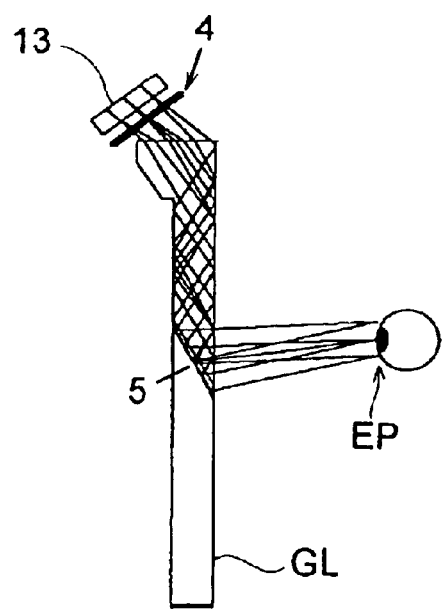
FIG. 22 is an optical arrangement diagram schematically showing the optical arrangement of a thirteenth embodiment of the invention.
Figure 23:
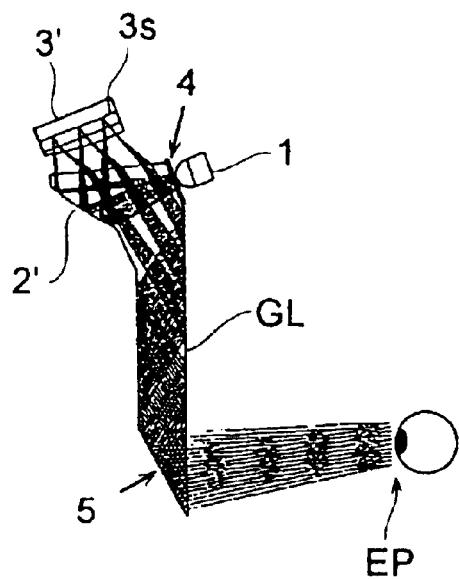
FIG. 23 is an optical arrangement diagram schematically showing the optical arrangement of a fourteenth embodiment of the invention.
Figure 24:
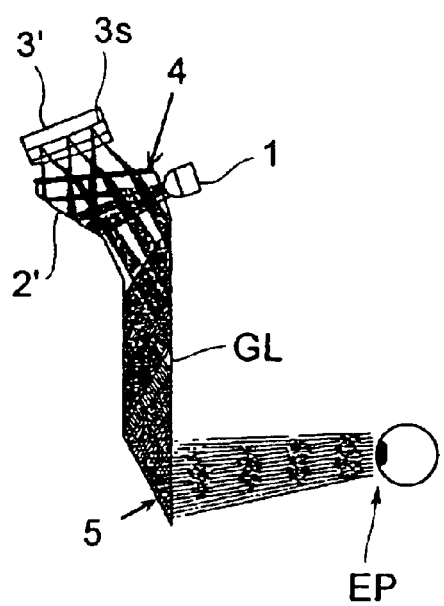
FIG. 24 is an optical arrangement diagram schematically showing the optical arrangement of a fifteenth embodiment of the invention.

Seventh Embodiment (FIGS. 15 to 16B)

FIG. 15 shows the optical arrangement of a seventh embodiment of the invention. In this image display device, in the same optical arrangement as that of the fifth embodiment, the holographic filter (4) functions not only as a filter but also as a condenser lens and as a color integrator. As in the fourth and fifth embodiments, the holographic filter (4) has a diffraction wavelength range narrower than the half-width of the light emission wavelength distribution (C0). It is preferable to design the holographic filter (4) to have a diffraction wavelength range narrower than the diffraction wavelength range of the holographic magnifying optical element (5). This is achieved, for example, by controlling the refractive index modulation factor and film thickness of these elements.

FIGS. 16A and 16B are graphs showing the wavelength distribution of the light before and after passing the holographic filter (4). The holographic filter (4), which restricts the wavelength range of the light incident on the holographic magnifying optical element (5), functions in the same manner as in the fifth embodiment. Moreover, color display is achieved in the same manner and the holographic filter (4) is manufactured in the same manner as in the sixth embodiment. However, here, the holographic filter (4) functions also as a color integrator, and therefore integrates colors by making the individual LEDs (1R, 1G, and 1B) form virtual images substantially in an identical position as observed from the holographic magnifying optical element (5).

Eighth to Fifteenth Embodiments (FIGS. 17 to 24)

Figure 34:
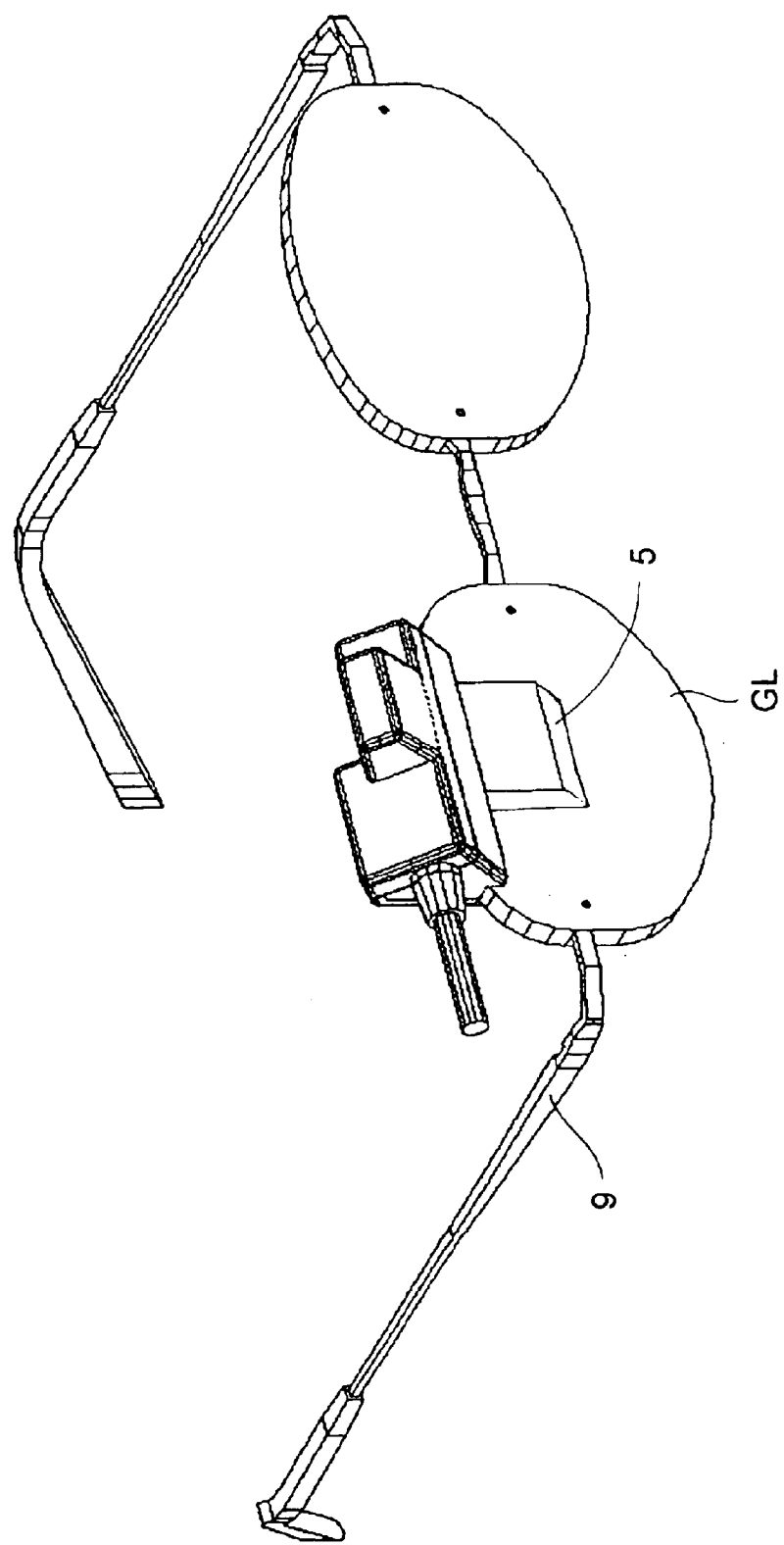
FIG. 34 is a perspective view schematically showing the external structure of a spectacle-type image display apparatus to which an embodiment of the invention is applied.

FIGS. 17 to 24 show the optical arrangements of an eighth to a fifteenth embodiment of the invention. These image display apparatus are spectacle-type image display apparatus in which an optical path runs inside a spectacle lens (GL) that functions as a prism. Moreover, as shown in FIG. 34, these image display apparatus are provided with a frame (9) that serves as a holding means for holding the apparatus on an observer's head, and is used as an HMD that permits the observer to observe a two-dimensional image on a see-through basis (a similar arrangement may be adopted in the other embodiments to permit the respective image display apparatus to be used as an HMD or the like). The spectacle lens (GL), with a holographic magnifying optical element (5) cemented thereto, functions as part of an eyepiece optical system.

In the eighth embodiment, a holographic filter (4) is arranged as part of an image display means in the optical path between a condenser lens (2) and an LCD (3), in a state cemented to the LCD (3). In the ninth embodiment, a holographic filter (4) is arranged as part of an image display means in the optical path between an LED (1) and a condenser lens (2), in a state cemented to the condenser lens (2). In the tenth embodiment, a holographic filter (4) is arranged in the optical path between an LED (1) as part of an image display means and a spectacle lens (GL) as part of an eyepiece optical system, in a state cemented to the top surface of the spectacle lens (GL). In the eleventh embodiment, a holographic filter (4) is arranged as part of an image display means in the optical path between an LED (1) and a condenser lens (2), in a state cemented to the LED (1). Arranging the holographic filter (4) near the LED (1) in this way helps reduce the filter surface and thereby reduce the associated costs.

In the twelfth embodiment, a holographic filter (4) is arranged as part of an eyepiece optical system in the optical path between a holographic magnifying optical element (5) and an observer's pupil (EP), in a state cemented to the image light exit surface of a spectacle lens (GL). The light that has been transmitted through the holographic filter (4) without being diffracted thereby (reflected light is cut) is observed as the image light by the observer's eye (EP). Using the light transmitted through the holographic filter (4) as the image light makes it possible to manufacture the holographic filter (4) with relatively large tolerances for its manufacturing errors, and thus to realize an image display apparatus that is easy and inexpensive to manufacture but that nevertheless permits high-quality display of images. This is because the quality of the obtained image is little affected by where the holographic filter (4) is arranged within the eyepiece optical system (i.e. whether the holographic filter (4) is manufactured with errors or not, assuming that the errors are moderate). The same applies also in cases where the holographic filter (4) is arranged in the optical path between the eyepiece optical system and the observer's eye (EP). The holographic filter (4) forms part of the eyepiece optical system but has no optical power. This is because giving the holographic filter (4) part of the optical power of the eyepiece optical system makes the design and manufacture of the holographic filter (4) difficult.

In the thirteenth embodiment, a self-illuminative display device (13) is used as an image display means, and a holographic filter (4) is arranged in the optical path between the self-illuminative display device (13) and an eyepiece optical system (5, GL). The self-illuminative display device (13) is realized with, for example, an EL (electroluminescence element).

In the fourteenth and fifteenth embodiments, a reflective LCD (3') is used as a spatial modulation device for displaying a two-dimensional image on a display surface (3s). The reflective LCD (3') is capable of high-speed operation, and thus permits color display on a time-division basis. In addition, the reflective LCD (3') is suitable for high-definition and inexpensive color display. Moreover, in the fourteenth and fifteenth embodiments, a spectacle lens (GL) has a lens surface (2') that functions as a condenser lens. This helps reduce the size of the apparatus.

In the fourteenth embodiment, a holographic filter (4) is arranged immediately behind an LED (1), in a state cemented to the pupil (EP) side surface of the spectacle lens (GL). By contrast, in the fifteenth embodiment, a holographic filter (4) is arranged in the optical path between the LCD (3') and the spectacle lens (GL), in a state cemented to the top surface of the spectacle lens (GL). Thus, in the fifteenth embodiment, both the illumination and image light passes through the holographic filter (4), which restricts the wavelength of the illumination light alone.

Figure 25:
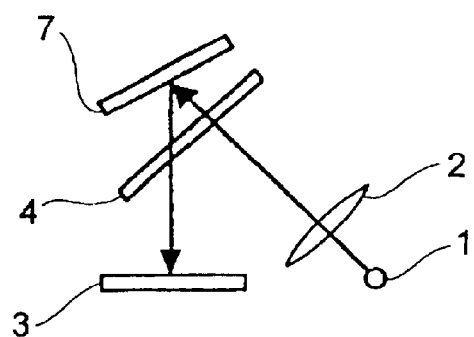
FIG. 25 is an optical arrangement diagram schematically showing the optical arrangement of a sixteenth embodiment of the invention.
Figure 26A:
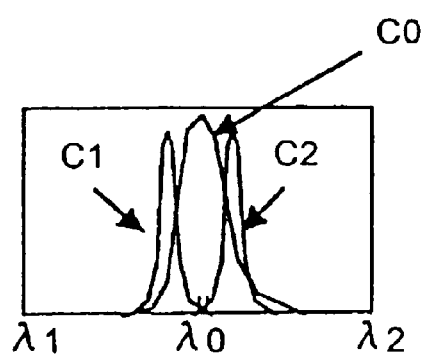
FIGS. 26A and 26B are graphs showing the wavelength distribution of the light before and after passing the holographic filter in the sixteenth embodiment.
Figure 26B:
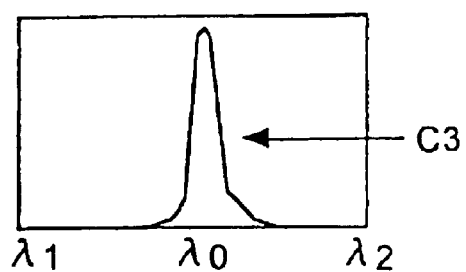

Sixteenth Embodiment (FIGS. 25 to 26B)

FIG. 25 shows the optical arrangement of a sixteenth embodiment of the invention. In this image display apparatus, the reflection on a reflecting mirror (7) makes it possible to cut both the longer- and shorter-wavelength sides of the light emission wavelength distribution with a single holographic filter (4). That is, the fact that a holographic optical element exhibits different diffraction wavelengths according to the angle of incidence is exploited to make the holographic filter (4) restrict the wavelength range of the image light by cutting reflected light. An arrangement similar to this may be adopted in the fifteenth and other embodiments described above.

FIGS. 26A and 26B are graphs showing the wavelength distribution of the light before and after passing the holographic filter (4). The holographic filter (4), which restricts the wavelength range of the light incident on a holographic magnifying optical element (5) in both the longer- and shorter-wavelength sides thereof, functions in the same manner as in the first embodiment, and therefore its explanation will be omitted. The arrangement of the sixteenth embodiment requires only one holographic filter (4), and is therefore inexpensive and simple. A similar arrangement is possible by the use of multiple-layer films, but it is difficult and expensive to manufacture a sharp, narrow-range filter with multiple-layer films.

Seventeenth and Eighteenth Embodiments (FIGS. 27A to 30B)

Figure 27A:
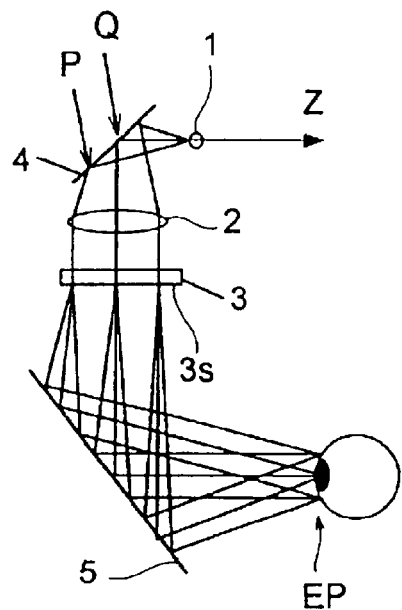
FIGS. 27A and 27B are optical arrangement diagrams schematically showing the optical arrangement of a seventeenth embodiment of the invention.
Figure 27B:
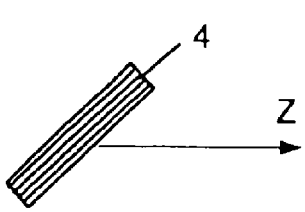
Figure 28A:
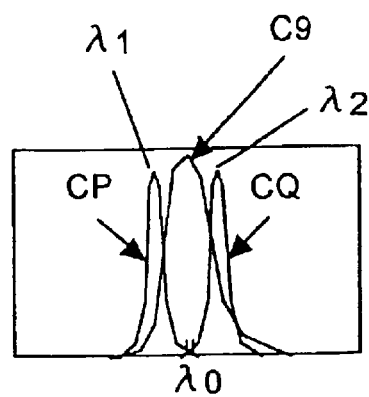
FIGS. 28A and 28B are graphs showing the diffraction wavelength distribution at different points on the holographic filter in the seventeenth embodiment.
Figure 28B:
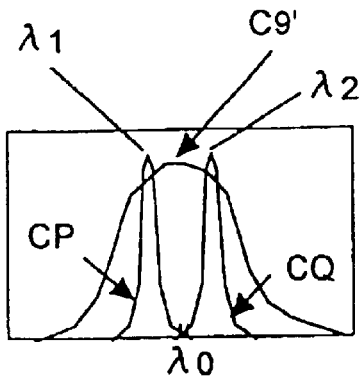
Figures 29A, 29B:
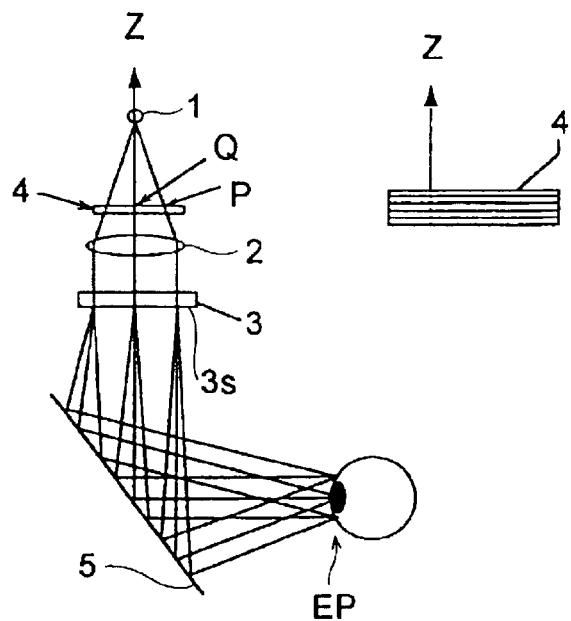
FIGS. 29A and 29B are optical arrangement diagrams schematically showing the optical arrangement of an eighteenth embodiment of the invention.
Figure 30A:
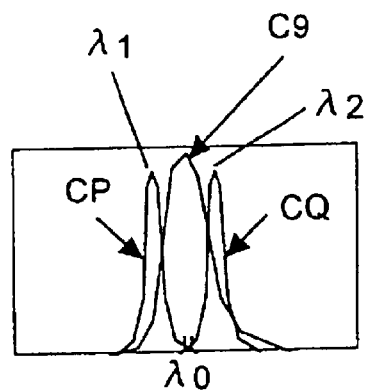
FIGS. 30A and 30B are graphs showing the diffraction wavelength distribution at different points on the holographic filter in the eighteenth embodiment.
Figure 30B:
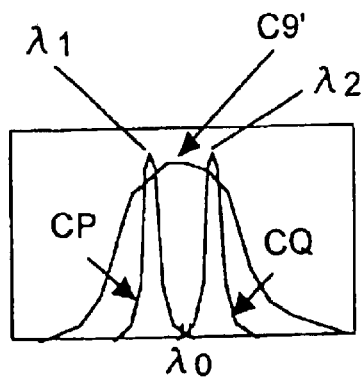

FIGS. 27A and 29A show the optical arrangements of the seventeenth and eighteenth embodiments, respectively. In FIGS. 27B and 29B, arrow Z indicates the direction normal to the interference fringes that are recorded as refractive index modulation on a holographic filter (4). In the seventeenth embodiment, image display is achieved by using the light reflected from the holographic filter (4), and, in the eighteenth embodiment, image display is achieved by using the light transmitted through the holographic filter (4). In these image display apparatus, the wavelength range diffracted by the holographic filter (4) varies according to the angle of incidence of the light incident thereon. Specifically, if it is assumed that the diffraction center wavelength of a holographic magnifying optical element (5) is $\lambda 0$, the center wavelength of the aforementioned wavelength range when light is incident on the holographic filter (4) at an angle of incidence at which the center wavelength of that wavelength range is at its minimum is $\lambda 1$, and the center wavelength of the aforementioned wavelength range when light is incident on the holographic filter (4) at an angle of incidence at which the center wavelength of that wavelength range is at its maximum is $\lambda 2$, then the relation $\lambda 1 < \lambda < \lambda 2$ is fulfilled.

FIGS. 28A, 28B, 30A, and 30B are graphs showing the diffraction wavelength distribution as observed at different points (P) and (Q) on the holographic filter (4) in the seventeenth and eighteenth embodiments. In FIGS. 28A, 28B, 30A, and 30B, line (C9) represents the diffraction wavelength distribution of the holographic magnifying optical element (5), line (C9') represents the light emission wavelength distribution of an LED (1), and lines (CP) and (CQ) represent the diffraction wavelength distribution at points (P) and (Q) on the filter surface.

In general, as the angle of incidence of the light incident on a holographic filter swerves from the direction (arrow Z) normal to the interference fringes recorded as refractive index modulation thereon, the diffraction center wavelength shifts to the shorter-wavelength side. In a case where the angle of incidence of the light incident on the holographic filter (4) is not uniform (i.e. when the light is a convergent or divergent beam, or the filter surface is a curved surface), the filtering effect varies from one portion to another on the filter surface. On the other hand, the holographic magnifying optical element (5) can be designed with a predetermined range of wavelengths in mind. Thus, if it is assumed that the diffraction center wavelength of the holographic magnifying optical element (5) as designed is $\lambda 0$, by setting the wavelength distribution in such a way that $\lambda 0$ is included in the wavelength range in which the filtering effect is obtained, it is possible to obtain a satisfactory filtering effect for the whole light that passes through the filter surface and eventually obtain satisfactory observation images. In the seventeenth and eighteenth embodiments, instead of the holographic filter (4), it is possible to use a narrow-range transmissive interference filter produced by laying thin films on one another. However, with an interference filter, it is difficult to realize an arrangement in which a plurality of LEDs are used to achieve color display.

Nineteenth and Twentieth Embodiments (FIGS. 31A to 33B)

Figure 33A:
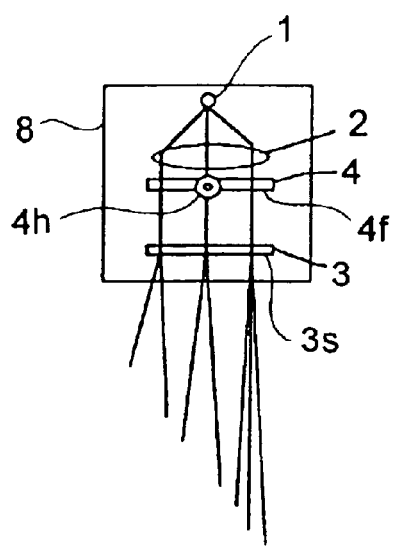
FIGS. 33A and 33B are optical arrangement diagrams schematically showing the optical arrangement of a twentieth embodiment of the invention.
Figure 33B:
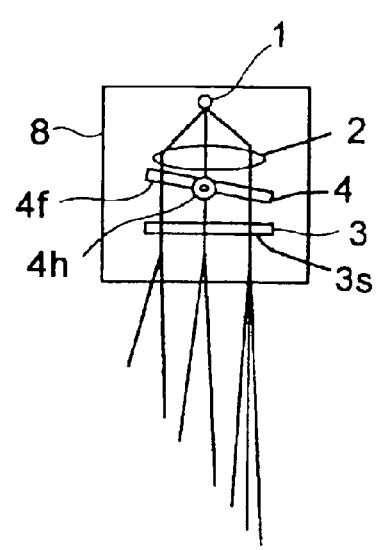

FIGS. 31A, 31B, 33A, and 33B show the optical arrangements of the nineteenth and twentieth embodiments, respectively. In the nineteenth and twentieth embodiments, a holographic filter (4) is arranged so as to be inclinable, with FIGS. 31A and 33A showing it in an uninclined state and FIGS. 31B and 33B showing it in an inclined state. Except that the holographic filter (4) is arranged so as to be inclinable, the arrangements of these embodiments are basically the same as those of the second and other embodiments. FIGS. 32A to 32C are graphs showing the variation of the diffraction wavelength distribution resulting from the inclination of the holographic filter (4) in the nineteenth embodiment. In FIGS. 32A to 32C, line (C0) represents the light emission wavelength distribution of an LED (1), line (C9) represents the diffraction wavelength distribution of a holographic magnifying optical element (5), and line (C2) represents the diffraction wavelength distribution of the holographic filter (4). Hatched area (L1) represents the range in which light is used as the image light.

In practical production of an image display apparatus in which the wavelength range of the light incident on a holographic magnifying optical element (5) is restricted with a holographic filter (4), when an LED (1) is used as an illumination light source for illuminating the displayed image, the LED (1) tends to have varying light emission center wavelengths between different lots. This results, in monochrome display, in dark observation images, and, in color display, in unexpected color balance in observation images or dark observation images. This can be avoided by preparing a plurality of types of holographic filter (4) corresponding to the varying light emission wavelengths of individual LEDs (1). However, preparing a plurality of types of holographic filter (4) leads to increased costs.

In the nineteenth and twentieth embodiments, the holographic filter (4) is so arranged that the angle of incidence of the light incident thereon can be varied. Thus, by varying the angle of incidence here, it is possible to vary the wavelength range in which the filtering effect acts and thereby cope with varying wavelength ranges. That is, by arranging the holographic filter (4) in such a way that a filter portion thereof (4f) is movable relative to a holder portion (4h) thereof, it is possible to exploit the fact that, as the angle of incidence of the light incident on the holographic filter (4) swerves from the direction normal to the interference fringes recorded as refractive index modulation thereon, the diffraction center wavelength shifts to the shorter-wavelength side.

For example, when the filtering effect is not obtained because of a variation on the part of the LED (1) (FIG. 32A), an adjustment is made by inclining the filter surface so that the filtering effect is obtained (FIGS. 32B and 32C), and then the holographic filter (4) is held in a fixed position on a housing (8). In the nineteenth embodiment, the holographic filter (4) is assumed to be arranged near the LCD (3), and therefore the holographic filter (4) is so arranged as to be inclined about an axis lying at an edge thereof However, in a case where the holographic filter (4) needs to be arranged near a condenser lens (2), the holographic filter (4) may be arranged so as to be inclined about an axis lying at the center thereof as in the twentieth embodiment. It is to be understood that the holographic filter (4) may be arranged in any other manner than in these specific examples. To vary the angle of incidence of light, it is preferable to vary the angle at which the holographic filter (4) is held as in the nineteenth and twentieth embodiments. However, it is also possible to hold the holographic filter (4) at a fixed angle and instead rotate it within the filter surface. It is to be understood that the angle of incidence of light may be varied in any other manner than in these specific examples.

The method of varying the angle at which the halter composed of multiple-layer films is used instead of the holographic filter (4). However, producing a multiple-layer-film filter with sharp wavelength characteristics requires coating of as many as several tens of layers or more, and thus leads to increased costs. Moreover, in cases where a plurality of colors are dealt with to achieve color display, it is difficult to produce a multiple-layer-film filter capable of handling a plurality of wavelength ranges. From these viewpoints, it is preferable to use a holographic filter (4), which is inexpensive and easy to manufacture.

As described above, according to the present invention, the chromatic aberration that appears in an eyepiece optical system including a holographic optical element is reduced as a result of the wavelength range of the light passing therethrough being restricted by a holographic filter. This makes it possible to realize an image display apparatus that has an inexpensive and simple arrangement but that nevertheless offers high-quality images.

What is claimed is:

1. An image display apparatus comprising:
   an image display device for displaying an image;
   an eyepiece optical system for magnifying and projecting the image, the eyepiece optical system including a holographic magnifying optical element; and
   a holographic filter for restricting a wavelength range of image light, the holographic filter being disposed either as part of the image display device or in an optical path between the image display device and the eyepiece optical system,
   wherein the holographic filter is a reflective hologram having a diffraction center wavelength longer than a diffraction center wavelength of the holographic magnifying optical element.

2. An image display apparatus comprising:
   an image display device for displaying an image;
   an eyepiece optical system for magnifying and projecting the image, the eyepiece optical system including a holographic magnifying optical element; and
   a holographic filter for restricting a wavelength range of image light, the holographic filter being disposed either as part of the image display device or in an optical path between the image display device and the eyepiece optical system,
   wherein the holographic filter is a reflective hologram having a diffraction center wavelength shorter than a diffraction center wavelength of the holographic magnifying optical element.

3. An image display apparatus comprising:
   an image display device for displaying an image;
   an eyepiece optical system for magnifying and projecting the image, the eyepiece optical system including a holographic magnifying optical element; and
   a holographic filter for restricting a wavelength range of image light, the holographic filter being disposed either as part of the image display device or in an optical path between the image display device and the eyepiece optical system,
   wherein the holographic filter has at least two diffraction center wavelengths of which one is shorter than a diffraction center wavelength of the holographic magnifying optical element and of which another is longer than a diffraction center wavelength of the holographic magnifying optical element.

4. An image display apparatus comprising:
   an image display device for displaying an image;
   an eyepiece optical system for magnifying and projecting the image, the eyepiece optical system including a holographic magnifying optical element; and
   a holographic filter for restricting a wavelength range of image light, the holographic filter being disposed either as part of the image display device or in an optical path between the image display device and the eyepiece optical system, wherein the holographic filter has a diffraction wavelength range narrower than a diffraction wavelength range of the holographic magnifying optical element.

5. An image display apparatus as claimed in claim 4, wherein the holographic filter has a diffraction wavelength range that varies according to an angle of incidence of light incident thereon so as to fulfill the relationship $\lambda 1<\lambda 0<\lambda 2$, where $\lambda 0$ represents a center wavelength of the diffraction wavelength range of the holographic magnifying optical element, $\lambda 1$ represents a center wavelength of the diffraction wavelength range of the holographic filter as observed when light is incident thereon at an angle of incidence at which the center wavelength of the diffraction wavelength range of the holographic filter is at a minimum, and $\lambda 2$ represents a center wavelength of the diffraction wavelength range of the holographic filter as observed when light is incident thereon at an angle of incidence at which the center wavelength of the diffraction wavelength range of the holographic filter is at a maximum.

6. An image display apparatus comprising:

an image display device for displaying an image;

an eyepiece optical system for magnifying and projecting the image, the eyepiece optical system including a holographic magnifying optical element; and at least one holographic filter for restricting a wavelength range of light incident on the holographic magnifying optical element, the holographic filter being arranged as part of the image display device.

7. An image display apparatus as claimed in claim 6, wherein the image display device includes a spatial modulation element for displaying the image on a display surface and an illumination light source for emitting illumination light for illuminating the display surface, and wherein the holographic filter is disposed between the illumination light source and the spatial modulation element.

8. An image display apparatus as claimed in claim 7, wherein the holographic filter is disposed near the illumination light source.

9. An image display apparatus comprising:

an image display device for displaying an image, the image display device including a spatial modulation element for displaying the image on a display surface and an illumination light source for emitting illumination light for illuminating the display surface;

an eyepiece optical system for magnifying and projecting the image, the eyepiece optical system including a holographic magnifying optical element; and at least one holographic filter for restricting a wavelength range of light incident on the holographic magnifying optical element, the holographic filter being arranged as part of the image display device, wherein the holographic filter is disposed between the illumination light source and the spatial modulation element, and wherein the holographic filter has a positive optical power so as to function also as a condenser lens for illumination.

10. An image display apparatus comprising:

an image display device for displaying an image, the image display device including a spatial modulation element for displaying the image on a display surface and an illumination light source for emitting illumination light for illuminating the display surface;

an eyepiece optical system for magnifying and projecting the image, the eyepiece optical system including a holographic magnifying optical element; and at least one holographic filter for restricting a wavelength range of light incident on the holographic magnifying optical element, the holographic filter being arranged as part of the image display device, wherein the holographic filter is disposed between the illumination light source and the spatial modulation element, and wherein the holographic magnifying optical element has a plurality of diffraction center wavelengths, and the illumination light source has at least two different light emission center wavelengths corresponding individually to the diffraction center wavelengths of the holographic magnifying optical element, the holographic filter restricting the wavelength range of at least light having two different center wavelengths among light having a plurality of different center wavelengths.

11. An image display apparatus as claimed in claim 10, wherein the illumination light source is composed of a plurality of light-emitting elements, and the holographic filter has a function of integrating colors in such a way that the individual light-emitting elements form virtual images substantially in an identical position as observed from the eyepiece optical system.

12. An image display apparatus as claimed in claim 10, wherein the holographic filter is composed of a plurality of reflective holograms cemented together.

13. An image display apparatus as claimed in claim 10, wherein the holographic filter is produced by multiple exposure.

14. An image display apparatus comprising:

an image display device for displaying an image, the image display device including a spatial modulation element for displaying the image on a display surface and an illumination light source for emitting illumination light for illuminating the display surface;

an eyepiece optical system for magnifying and projecting the image, the eyepiece optical system including a holographic magnifying optical element; and at least one holographic filter for restricting a wavelength range of light incident on the holographic magnifying optical element, the holographic filter being arranged between the image display device and the eyepiece optical system, wherein the holographic filter is disposed between the spatial modulation element and the eyepiece optical system, and wherein the holographic magnifying optical element has a plurality of diffraction center wavelengths, and the illumination light source has at least two different light emission center wavelengths corresponding individually to the diffraction center wavelengths of the holographic magnifying optical element, the holographic filter restricting the wavelength range of at least light having two different center wavelengths among light having a plurality of different center wavelengths.

15. An image display apparatus as claimed in claim 14, wherein the illumination light source is composed of a plurality of light-emitting elements, and the holographic filter has a function of integrating colors in such a way that the individual light-emitting elements form virtual images substantially in an identical position as observed from the eyepiece optical system.

16. An image display apparatus as claimed in claim 14, wherein the holographic filter is composed of a plurality of reflective holograms cemented together.

17. An image display apparatus as claimed in claim 14, wherein the holographic filter is produced by multiple exposure.

* * * * *